US008782749B2

(12) United States Patent
Takemura et al.

(10) Patent No.: US 8,782,749 B2
(45) Date of Patent: Jul. 15, 2014

(54) INFORMATION PROCESSING DEVICE, INFORMATION PROCESSING METHOD, AND PROGRAM

(75) Inventors: Toshiharu Takemura, Tokyo (JP); Hiroaki Hamada, Kanagawa (JP); Katsuya Shimoji, Tokyo (JP); Kazuyuki Sakamoto, Chiba (JP); Daisuke Shiigi, Kanagawa (JP); Yasumasa Nakatsugawa, Kanagawa (JP); Tadashi Morita, Tokyo (JP)

(73) Assignee: Sony Corporation (JP)

( * ) Notice: Subject to any disclaimer, the term of this patent is extended or adjusted under 35 U.S.C. 154(b) by 45 days.

(21) Appl. No.: 13/066,098

(22) Filed: Apr. 6, 2011

(65) Prior Publication Data
US 2011/0252458 A1    Oct. 13, 2011

(30) Foreign Application Priority Data

Apr. 13, 2010    (JP) ................ P2010-092062

(51) Int. Cl.
*G06F 15/16* (2006.01)
*G06F 21/60* (2013.01)
*G06F 7/04* (2006.01)
*G06F 17/30* (2006.01)
*H04L 29/06* (2006.01)

(52) U.S. Cl.
CPC ................... *G06F 21/606* (2013.01)
USPC ............................ 726/4; 713/150

(58) Field of Classification Search
CPC ................................................. G06F 21/606
See application file for complete search history.

(56) References Cited

U.S. PATENT DOCUMENTS

| 2004/0139021 A1* | 7/2004 | Reed et al. ....................... 705/50 |
| 2006/0242151 A1* | 10/2006 | Jogand-Coulomb et al. ..... 707/9 |
| 2009/0307491 A1 | 12/2009 | Nakatsugawa et al. |
| 2010/0332820 A1* | 12/2010 | Matsushima et al. ......... 713/150 |

FOREIGN PATENT DOCUMENTS

| JP | 2002330127 A | 11/2002 |
| JP | 2003196160 A | 7/2003 |
| JP | 2008165456 A | 7/2008 |
| JP | 2009151401 A | 7/2009 |
| JP | 2009-296463 A | 12/2009 |

OTHER PUBLICATIONS

European Search Report EP 11160079, dated Jun. 21, 2012.
Office Action from Japanese Application No. 2010-092062, dated Sep. 24, 2013.

\* cited by examiner

*Primary Examiner* — Shin-Hon Chen
(74) *Attorney, Agent, or Firm* — Lerner, David, Littenberg, Krumholz & Mentlik, LLP

(57) ABSTRACT

An IC card compatible with a DES scheme and an AES scheme having a security strength different from that of the DES scheme, includes an inhibition information receiving section for receiving inhibition information for inhibiting predetermined manipulation from being performed in a storage region of the IC card using the DES scheme from an issuing device using the AES scheme, an inhibition flag setting section for performing inhibition processing for inhibiting the predetermined manipulation by the inhibition information, a manipulation request receiving section for receiving a manipulation request from a service providing device or the issuing device, and a manipulation executing section for executing the requested manipulation if the requested manipulation does not correspond to the predetermined manipulation inhibited by the inhibition information.

6 Claims, 14 Drawing Sheets

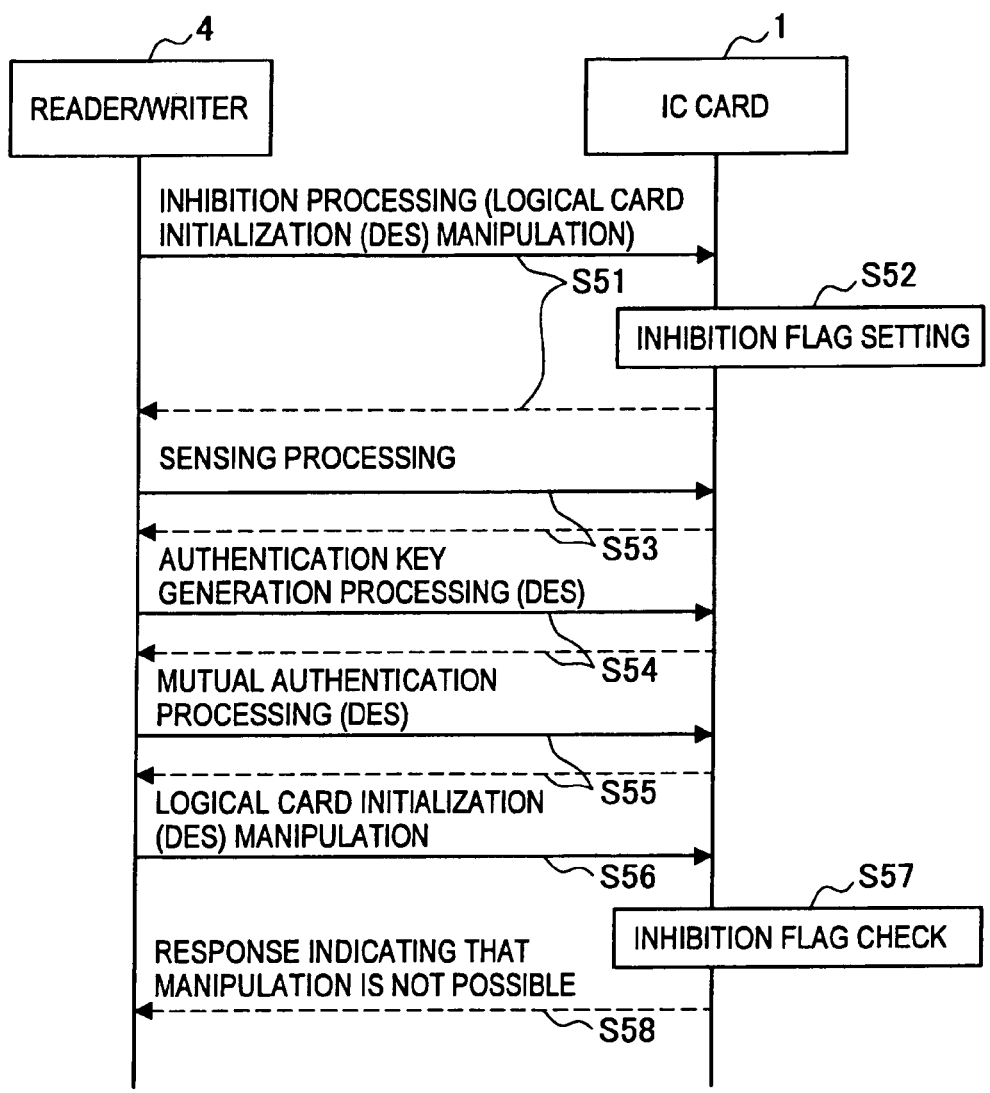

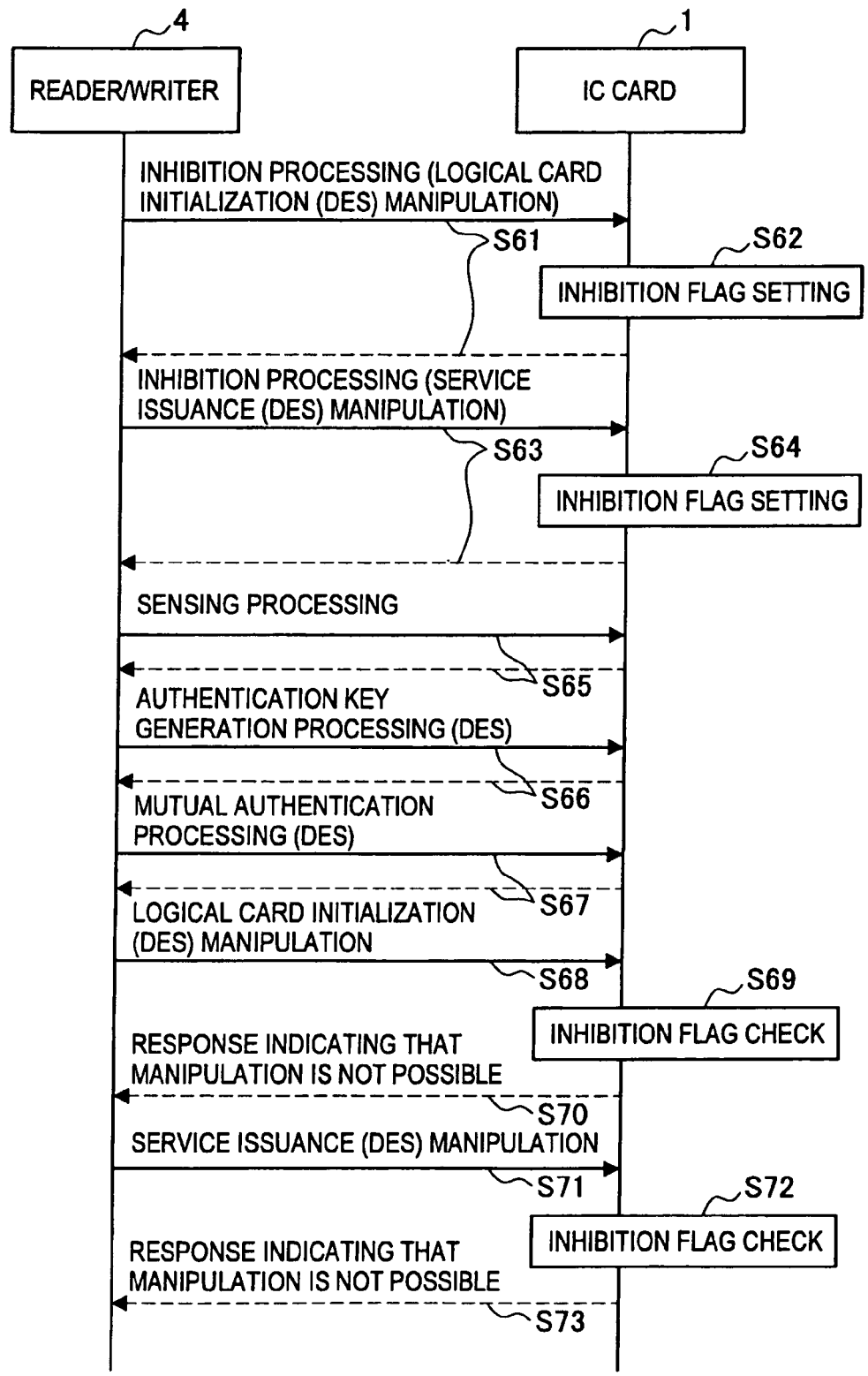

INFORMATION PROCESSING DEVICE, INFORMATION PROCESSING METHOD, AND PROGRAM

CROSS-REFERENCE TO RELATED APPLICATION

The present application claims priority from Japanese Patent Application No. JP 2010-092062 filed in the Japanese Patent Office on Apr. 13, 2010, the entire content of which is incorporated herein by reference.

BACKGROUND

1. Technical Field

The present disclosure relates to an information processing device, an information processing method, and a program.

2. Description of the Related Art

In electronic money systems, security systems, and the like, information processing devices such as a non-contact IC card, a portable terminal, and the like on which a reader/writer and a non-contact communicable IC chip are mounted are being widely used. In these information processing devices, data necessary to use various types of services is securely transmitted and managed in a storage region.

Here, a plurality of encryption schemes have been proposed as an encryption scheme for securely transmitting data. Recently, the encryption scheme is shifting from an existing data encryption standard (DES) scheme to an encryption scheme having high security strength such as an advanced encryption standard (AES) scheme.

If the encryption scheme shifts from the existing encryption scheme to a new encryption scheme, a protocol between the reader/writer and the information processing device should be changed. On the other hand, it is not possible to immediately replace existing information processing devices distributed to users, Thus, as disclosed in Japanese Patent Application Laid-Open No. 2008-149824, information processing devices compatible with existing and new encryption schemes are distributed and systems compatible with the two encryption schemes are in operation at present.

SUMMARY

However, it is not possible to inhibit manipulation from being performed in a storage region using an encryption scheme having low security strength among predetermined manipulations to be performed in the storage region in the related art. Thus, for example, by unauthorized manipulation using the existing encryption scheme, the use of a service may be difficult when the format of the storage region is initialized, and the storage region may be unnecessarily consumed when service information is added to the storage region.

In light of the foregoing, it is desirable to provide an information processing device, an information processing method, and a program that can inhibit unauthorized manipulation from being performed in a storage region using an encryption scheme having low security strength.

According to an embodiment of the present disclosure, there is provided an information processing device compatible with a first encryption scheme and a second encryption scheme having a security strength different from that of the first encryption scheme, the device including an inhibition information receiving section for receiving inhibition information for inhibiting predetermined manipulation from being performed in a storage region of the information processing device using the first encryption scheme from an external device using the second encryption scheme, an inhibition processing section for performing inhibition processing for inhibiting the predetermined manipulation by the inhibition information, a manipulation request receiving section for receiving a manipulation request from the external device or another external device, and a manipulation executing section for executing the requested manipulation if the requested manipulation does not correspond to the predetermined manipulation inhibited by the inhibition information.

The storage region may be divided into a plurality of logical regions respectively available by different operating subjects, and the inhibition information may be set by authorization of an operating subject capable of using each of the logical regions so as to inhibit predetermined manipulation from being performed in each of the logical regions using the first encryption scheme.

The inhibition information may include information that designates format initialization manipulation of the storage region as the predetermined manipulation. The inhibition information may include information that designates addition of service information to the storage region as the predetermined manipulation.

According to another embodiment of the present disclosure, there is provided an information processing method, which is applied to an information processing device compatible with a first encryption scheme and a second encryption scheme having a security strength different from that of the first encryption scheme, the method including the steps of receiving inhibition information for inhibiting predetermined manipulation from being performed in a storage region of the information processing device using the first encryption scheme from an external device using the second encryption scheme, performing inhibition processing for inhibiting the predetermined manipulation by the inhibition information, receiving a manipulation request from the external device or another external device, and executing the requested manipulation if the requested manipulation does not correspond to the predetermined manipulation inhibited by the inhibition information.

According to another embodiment of the present disclosure, there is provided a program for causing a computer to execute the information processing method. Here, the program may be provided by using a computer-readable recording medium and may be provided via communication means.

According to the present disclosure as described above, it is possible to provide an information processing device, an information processing method, and a program that can inhibit unauthorized manipulation from being performed in a storage region using an encryption scheme having low security strength.

BRIEF DESCRIPTION OF THE DRAWINGS

FIG. 14 is a sequence diagram showing a procedure of inhibiting the execution of unauthorized manipulation in the first use case; and FIG. 15 is a sequence diagram showing a procedure of inhibiting the execution of unauthorized manipulation in the second use case.

DETAILED DESCRIPTION OF THE EMBODIMENT(S)

Figure 1:
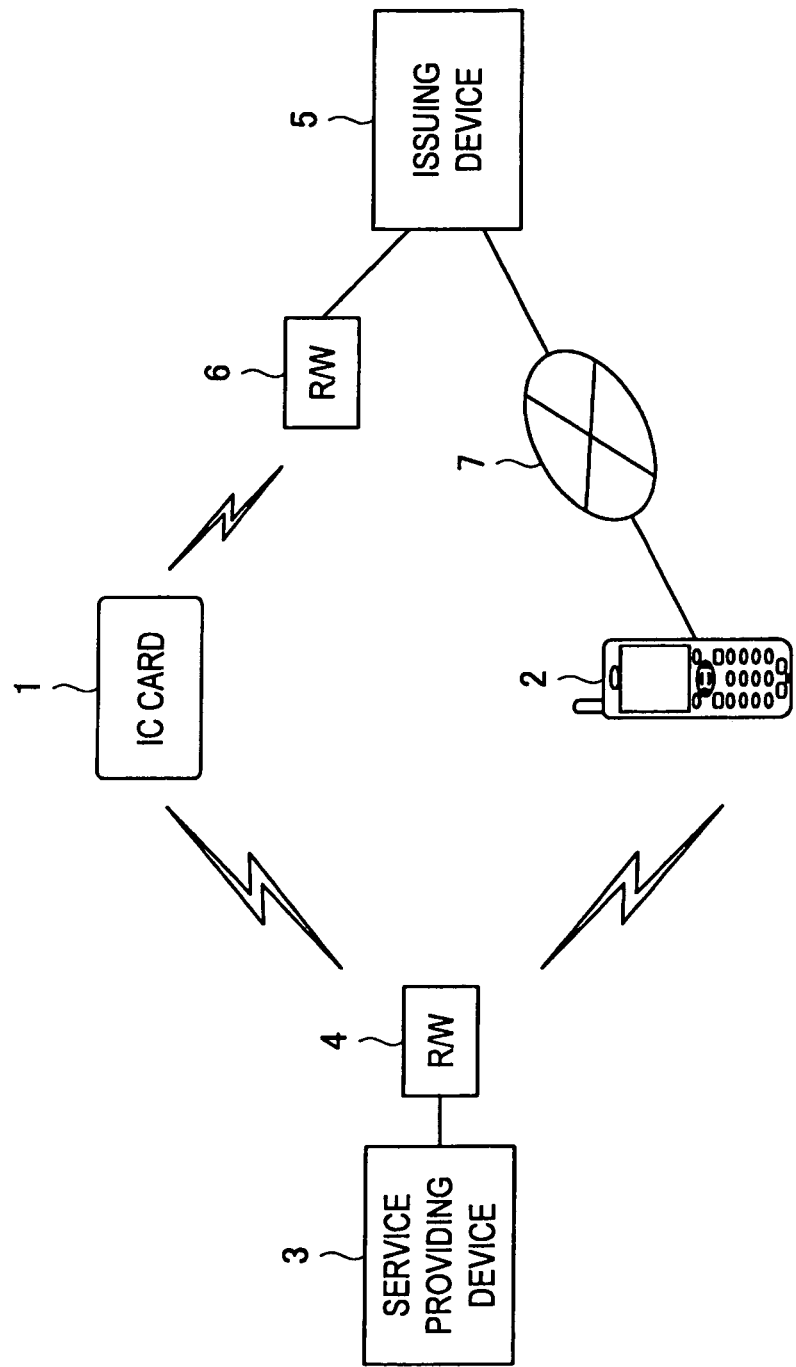
FIG. 1 is a schematic diagram showing an IC card system according to an embodiment of the present disclosure.

Hereinafter, preferred embodiments of the present disclosure will be described in detail with reference to the appended drawings. In this specification and the drawings, elements having substantially the same functional configurations are denoted by the same reference numerals, and redundant description thereof is omitted.

In this specification, the preferred embodiments of the present disclosure will be described in the following order.

1. IC Card System
2. Configuration of IC Card
3. Storage Region and Issuance Process of IC Card
4. Manipulation Inhibition Processing
5. Use Cases of IC Card
6. Summary

[1. IC Card System]

Figure 2:
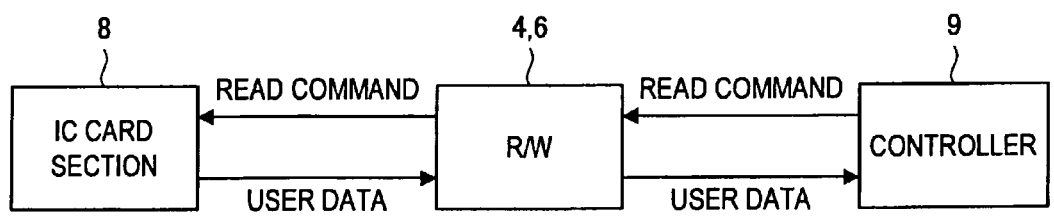
FIG. 2 is a block diagram showing a main configuration of the IC card system.
Figure 3:
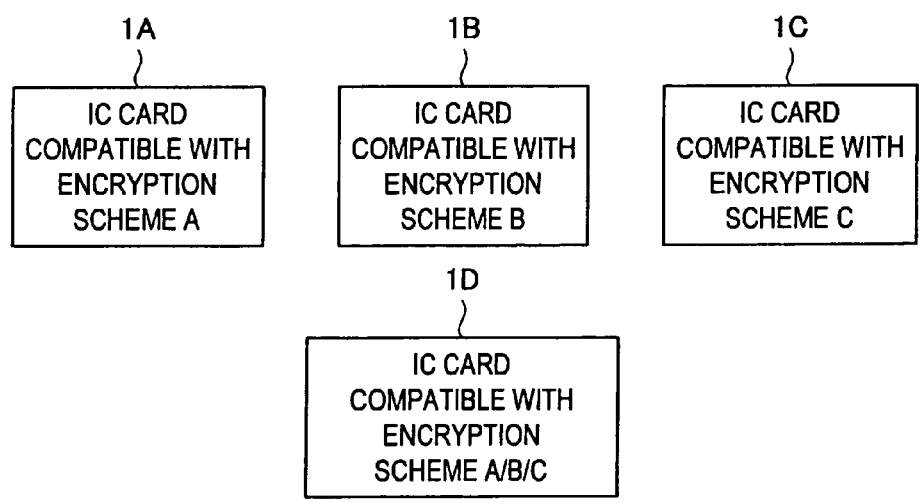
FIG. 3 is an illustrative diagram showing an encryption scheme corresponding to each IC card.

First, the IC card system according to an embodiment of the present disclosure will be described with reference to FIGS. 1 to 3. FIG. 1 shows the IC card system, and FIG. 2 shows a main configuration of the IC card system. FIG. 3 shows an encryption scheme corresponding to each IC card.

As shown in FIG. 1, the IC card system has an information processing device (a non-contact IC card 1, a portable terminal 2, or the like) and an external device (a service providing device 3, an issuing device 5, or the like).

The information processing device is the non-contact IC card 1 (hereinafter, also referred to as the IC card 1), the portable terminal 2, or the like, and has a non-contact communication IC chip. The external device is the service providing device 3 connected to a reader/writer 4, the issuing device 5 connected to a reader/writer 6, or the like.

The IC card 1 has an antenna for performing non-contact communication with the reader/writer 4 or 6 of the external device 3 or 5, and an IC chip for performing predetermined arithmetic processing. The IC card 1 can perform non-contact communication with the reader/writer 4 or 6 of the external device 3 or 5. Consequently, it is possible to read/write data from/to the IC card 1 if the IC card 1 is held over the reader/writer 4 or 6.

The IC card 1 is applied to an IC card system that provides various types of services. The IC card 1 is applied to an electronic money system, a ticket gate system of a transportation facility, a security system for entrance/admission to a building, login to a personal computer, or the like, an electronic payment system, or the like. As the IC card 1, multi-application types of cards compatible with a plurality of services are being used in practice.

The portable terminal 2 is a portable information processing device having the same IC chip as the IC card 1, or a mobile device such as a portable phone, a watch, a portable information terminal, a portable gaming machine, or a portable video/audio player. Like the IC card 1, the portable terminal can also perform non-contact communication with the reader/writer 4 or 6 and use various types of services.

The service providing device 3 is a host device for providing a predetermined service using the information processing device 1 or 2. The service providing device 3 is an automatic ticket gate machine of a transportation facility, a register device of a shop, a terminal device for electronic commerce, an automatic vending machine, a POS terminal, a kiosk machine, an ATM of a financial facility, or the like. The service providing device 3 has the reader/writer 4 for performing non-contact communication with the information processing device 1 or 2. The reader/writer 4 may be built into the service providing device 3, or may be connected to the service providing device 3 in a wired or wireless fashion as a separate device.

If the information processing device 1 or 2 is held over the reader/writer 4 of the service providing device 3, information regarding a predetermined service is communicated between the two devices in the non-contact communication. Thereby, users of the information processing devices 1 and 2 can use various types of services.

The issuing device 5 generates issuance information for issuing management information, and provides the issuance information to the information processing device 1 or 2. The management information is information for managing user data to be used in various types of services, and the issuance information is information for issuing the management information. The issuance information is provided in a state in which the issuance information is encrypted using a predetermined encryption scheme.

Thus, the issuing device 5 has the reader/writer 6 for non-contact communication with the information processing device 1 or 2. The reader/writer 6 may be built into the issuing device 5, or may be connected to the issuing device 5 in a wired or wireless fashion as a separate device. The issuing device 5 is communicable with the portable terminal 2 via a network 7.

The IC card 1 performs non-contact communication with the reader/writer 6 of the issuing device 5, and acquires encrypted issuance information (encryption issuance information) from the issuing device 5. Thereby, for example, if the IC card 1 is held over the reader/writer 6 of the issuing device 5 upon shipment of the IC card 1 in a card manufacturing factory, encryption issuance information can be provided from the issuing device 5 to the IC card 1.

The portable terminal 2 communicates with the issuing device 5 via the network 7, and acquires the encryption issuance information from the issuing device 5. The issuing device 5 includes a server device communicable with the network, and transmits issuance information to the portable terminal 2 via the network 7. Thereby, the encryption issuance information can be provided from the issuing device 5 to the portable terminal 2 at any point in time when the portable terminal 2 accesses the issuing device 5 via the network 7.

As shown in FIG. 2, main parts of the IC card system include an IC card section 8 of the information processing device such as the IC card 1 or the portable terminal 2, a controller 9 of the external device such as the service providing device 3 or the issuing device 5, and the reader/writer 4 or 6 of the external device 3 or 5.

Figure 4:
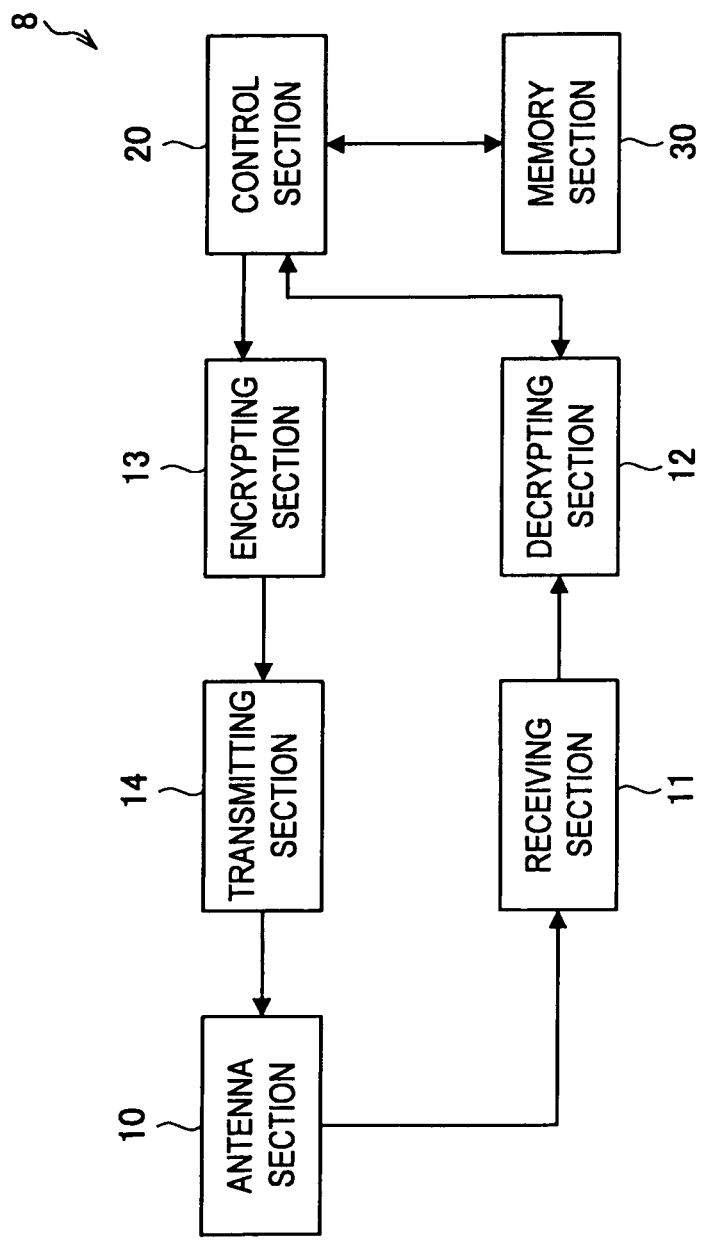
FIG. 4 is a block diagram showing a main configuration of the IC card.

The IC card section 8 has an antenna (an antenna section 10 of FIG. 4) for non-contact communication with the reader/writer 4 or 6, an IC chip, and a memory (a memory section 30 of FIG. 4). The IC card section 8 may be a card-shaped IC card, may be embedded into the portable terminal 2, or may be realized in any form. The IC card section 8 and the reader/writer 4 or 6 perform wired or wireless communication by a predetermined communication scheme such as "ISO/IEC 18092." The reader/writer 4 or 6 may be connected to the controller 9 in a wired or wireless fashion.

The controller 9 transmits a read command to the IC card section 8 via the reader/writer 4 or 6, reads user data from the memory in response to the read command, and transmits the user data to the controller 9 via the reader/writer 4 or 6.

The IC card system is configured as a system in which non-contact communication is performed between the IC card section 8 of the IC card 1 or the portable terminal 2 and the reader/writer 4 or 6 of the external device 3 or 5. The reader/writer 4 or 6 generates a radio frequency (RF) operation-related magnetic field, transmits power to the IC card section 8, and modulates the RF operation-related magnetic field in response to a command, data, or the like. Thereby, data is communicated between the reader/writer 4 or 6 and the IC card section 8 by non-contact communication. In the IC card system, the reader/writer 4 or 6 issues various types of commands to the IC card section 8 and the IC card section 8 responds to a command, so that a transaction is executed and data communication related to a predetermined service is performed.

In this embodiment as shown in FIG. 3, the use of the IC card 1 compatible with a plurality of encryption schemes is assumed. That is, IC cards 1A, 1B, and 1C of the related art correspond to encryption schemes A, B, C in point-to point correspondence, but an IC card 1D according to this embodiment corresponds to a plurality of encryption schemes, for example, encryption schemes A, B, and C, in point-to-multipoint correspondence.

Any encryption scheme such as a common key encryption scheme of DES, AES, Camellia, CLEFIA, or the like or a public key encryption scheme of Rivest Shamir Adleman (RSA) or the like is applied as the encryption scheme. The respective encryption schemes are superior or inferior to each other in reliability in terms of security or processing load upon encryption processing

[2. Configuration of IC Card]

Figure 5:
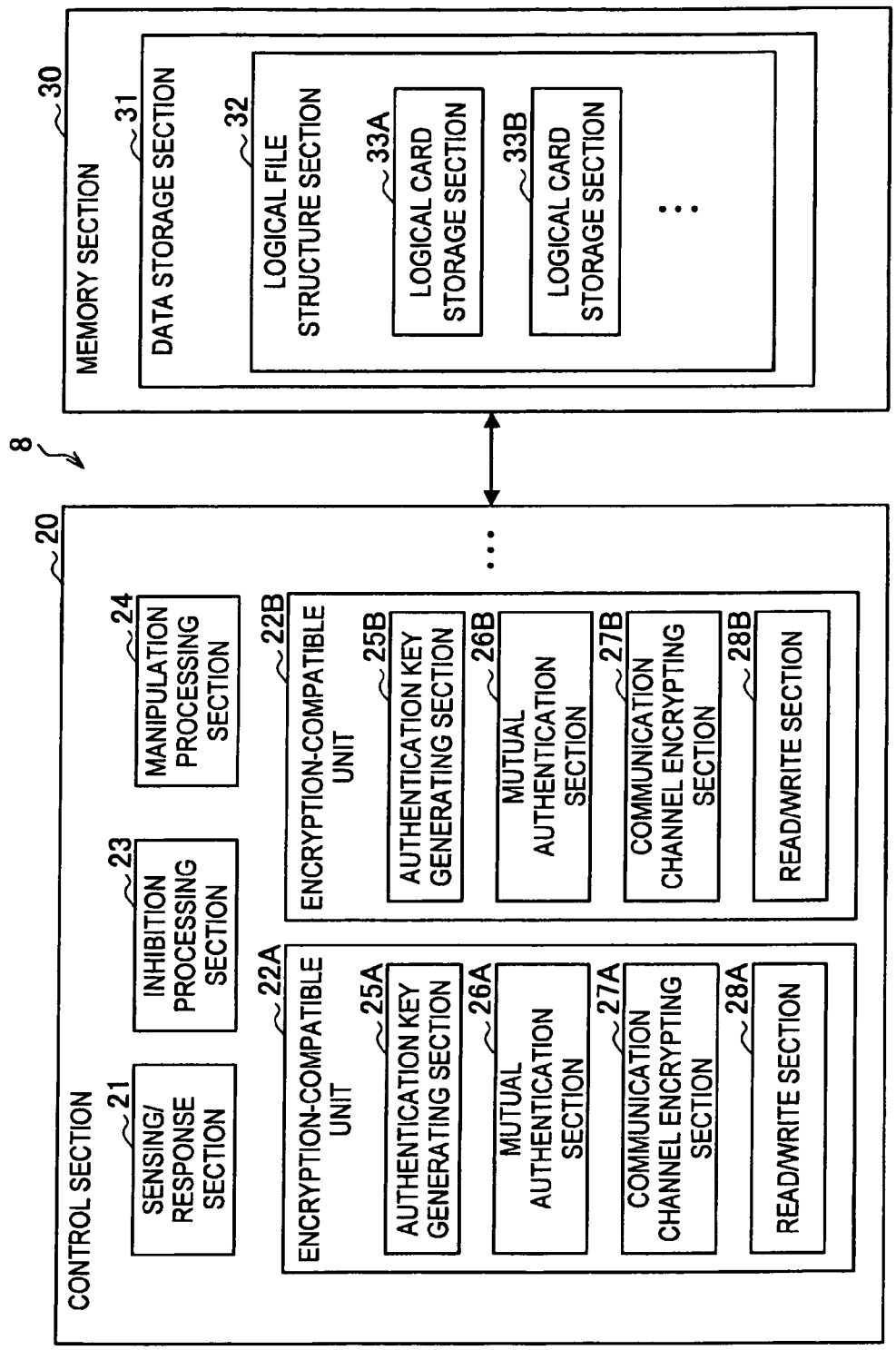
FIG. 5 is a block diagram showing a control section and a memory section of the IC card.

Next, the configuration of the IC card 1 according to an embodiment of the present disclosure will be described with reference to FIGS. 4 and 5. FIG. 4 shows a main configuration of the IC card 1, and FIG. 5 shows configurations of a control section 20 and the memory section 30 of the IC card 1.

As shown in FIG. 4, the IC card section 8 has the antenna section 10, a receiving section 11, a decrypting section 12, an encrypting section 13, a transmitting section 14, the control section 20, and the memory section 30.

The antenna section 10 is an antenna for non-contact communication with the reader/writer 4 or 6. The receiving section 11 demodulates reception data from the reader/writer 4 or 6. The decrypting section 12 decrypts the demodulated reception data. The encrypting section 13 encrypts transmission data directed to the reader/writer 4 or 6. The transmitting section 14 modulates encrypted transmission data. The control section 20 controls each part of the IC card section 8. The memory section 30 is a memory that retains user data and data of management information or the like.

The receiving section 11, the decrypting section 12, the encrypting section 13, the transmitting section 14, the control section 20, and the memory section 30 include a predetermined circuit and are mounted on a small-sized IC chip. The antenna section 10 includes a coil antenna arranged along an outer edge of the IC card 1, and is connected to the receiving section 11 and the transmitting section 14.

The receiving section 11 and the transmitting section 14 include a modem circuit, a front-end circuit, a power generating circuit, and the like, which are not shown. The modem circuit modulates/demodulates data by an ASK modulation scheme or the like. The power generating circuit generates induced electromotive force from an RF operation-related magnetic field of a carrier wave received through the antenna section 10, and is introduced as a power supply of the IC card section 8.

The front-end circuit modulates a carrier wave received through the antenna section 10, acquires a command or data from the reader/writer 4 or 6, and supplies the command or data to the control section 20. The front-end circuit frequency-divides the carrier wave and generates a clock for driving the IC card section 8. Furthermore, the front-end circuit modulates the carrier wave in response to a command or data regarding a predetermined service, and transmits the modulated carrier wave from the antenna section 10 to the reader/writer 4 or 6.

The decrypting section 12 and the encrypting section constitute an encryption processing section, and, for example, include dedicated hardware of an encryption processor or the like having an encryption processing function. The decrypting section 12 and the encrypting section 13 are compatible with a plurality of different encryption schemes. Thereby, the IC card section 8 is capable of non-contact communication with the external reader/writer 4 or 6 using the plurality of encryption schemes.

The control section 20 includes an arithmetic processing device such as a microprocessor, ROM, RAM, and the like, which are not shown, controls each part of the IC card section 8, and also performs predetermined arithmetic processing. The control section 20 operates according to a program stored in the memory section 30, ROM, or the like, and controls predetermined arithmetic processing, command generation, control for transmitting/receiving and reading/writing various types of information, or the like. For example, when the control section 20 communicates with the reader/writer 4 or 6 in relation to a predetermined service, user data regarding the service is read/written from/to the memory section 30. The control section 20 controls data encryption/decryption processing by the decrypting section 12 and the encrypting section 13. The control section 20 determines whether or not encryption/decryption processing is necessary so that the encryption/decryption processing is performed for predetermined transmission/reception data.

The memory section 30 includes a semiconductor memory such as a flash memory, an electrically erasable and programmable ROM (EEPROM), or a ferroelectric RAM (FeRAM). The memory section 30 functions as a data storage section 31 to be described later, and stores user data for using a predetermined service by non-contact communication and data for managing the user data. The memory section 30 securely retains an authorization key for decrypting encryption issuance information. The memory section 30 may include a storage device such as an HDD other than the semiconductor memory.

As shown in FIG. 5, the memory section 30 has the data storage section 31 including a logical file structure section 32 in which management information and user data are hierarchically structured. The logical file structure section 32 has a logical file structure in which a definition region, which is a storage region of management information, is logically and hierarchically structured and various types of definition information are hierarchically retained. As will be described later, storage regions 33A and 33B for a plurality of logical cards (logical cards 50A, 50B, and the like) are provided in the logical file structure section 32.

As shown in FIG. 5, the control section 20 has one sensing/response section 21, a plurality of encryption-compatible units 22A and 22B, an inhibition processing section 23, and a manipulation processing section 24. The encryption-compatible units 22A and 22B are provided for each encryption scheme compatible with the decrypting section 12 and the encrypting section 13 (the encryption processing section). For example, if the encryption processing section is compatible with DES and AES, the encryption-compatible unit 22A of DES and the encryption-compatible unit 22B of AES are provided. Three or more encryption-compatible units may be provided as encryption-compatible units 22A, 22B, 22C, . . . .

Each encryption-compatible unit 22A, 22B, or the like has an authentication key generating section 25A, 25B, or the like, a mutual authentication section 26A, 26B, or the like, a communication channel encrypting section 27A, 27B, or the like, and a read/write section 28A, 28B, or the like. That is, each encryption-compatible unit 22A, 22B, or the like is provided for each encryption scheme, and is a unit in which a plurality of functional parts necessary for communication using each encryption scheme are combined.

Each part of the control section 20 is realized by mounting a program for executing a function of each part on the information processing device 1 or 2 and causing a processor of the control section 20 to execute the program. The program is provided to the information processing device 1 or 2 via a storage medium or a communication medium. However, each part of the control section 20 may be realized by mounting hardware having a function of each part on the information processing device 1 or 2.

The sensing/response section 21 has a function corresponding to a polling command or the like proposed in "ISO/IEC 18092" or the like. Upon receipt of a polling command related to a predetermined IC card system from the reader/writer 4 or 6, the sensing/response section 21 generates a corresponding response command and transmits the response command to the reader/writer 4 or 6. The sensing/response section 21 is provided commonly in the plurality of encryption schemes.

The authentication key generating section 25A, 25B, or the like generates an authentication key necessary for mutual authentication between the IC card section 8 and the reader/writer 4 or 6. The authentication key generating section 25A, 25B, or the like generates an authentication key from a service key of a storage region to be accessed by a service serving as a target to be used and an ID (card ID) unique to the IC card section 8. If a plurality of services serve as targets to be used simultaneously, a degenerate key is generated from a plurality of service keys and an authentication key is generated from the degenerate key and the card ID. The authentication key is used in mutual authentication processing.

The mutual authentication section 26A, 26B, or the like performs mutual authentication between the IC card section 8 and the reader/writer 4 or 6. The mutual authentication section 26A, 26B, or the like decrypts and re-encrypts a random number received from the reader/writer 4 or 6 using the authentication key generated by the authentication key generation section 25A, 25B, or the like, and transmits the re-encrypted random number to the reader/writer 4 or 6. The mutual authentication section 26A, 26B, or the like encrypts the generated random number using the authentication key, transmits the encrypted random number to the reader/writer 4 or 6, receives its response from the reader/writer 4 or 6, and determines whether it is identical to the transmitted random number. Mutual authentication is performed by checking whether the random numbers mutually generated by the reader/writer 4 or 6 and the IC card section are accurate. The mutual authentication processing is performed by the encryption scheme designated from the reader/writer 4 or 6.

The communication channel encrypting section 27A, 27B, or the like encrypts a communication channel between the IC card 1 and the reader/writer 4 or 6 using a block encryption scheme prescribed in "NIST SP 800-38." After the mutual authentication processing, the communication channel encrypting section 27A, 27B, or the like encrypts a communication channel using a session key generated with the mutually checked random numbers as a communication channel encryption key, and transmits/receives various types of data.

The read/write section 28A, 28B, or the like reads or writes various types of data from or to the memory section 30. The read/write section 28A, 28B, or the like receives a user data read request for a predetermined service from the reader/writer 4 or 6, and writes the user data read request to a predetermined service definition region of the data storage section 31. The read/write section 28A, 28B, or the like writes management information issued on the basis of issuance information to a predetermined storage region of the data storage section 31. As described later, the read/write section 28A, 28B, or the like reads/writes an inhibition flag 52A, 52B, or the like from/to a predetermined storage region, and reads/writes data necessary for format initialization manipulation and service issuance manipulation of each logical card 50A, 50B, or the like to be described later.

As described below in detail, the inhibition processing section 23 performs inhibition processing for inhibiting predetermined manipulation from being performed in a storage region of each logical card 50A, 50B, or the like. In the inhibition processing, manipulations such as the format initialization manipulation and the service issuance manipulation to be performed using an encryption scheme having low security strength (DES or the like) are inhibited.

The manipulation processing section 24 performs processing necessary for predetermined manipulation to be performed in the storage region of each logical card 50A, 50B, or the like. In the manipulation processing, for example, processing necessary for manipulations such as the format initialization manipulation, the service issuance manipulation, data access, and the like to be performed using different encryption schemes (AES, DES, and the like) is performed.

[3. Storage Region and Issuance Process of IC Card]

Figure 6:
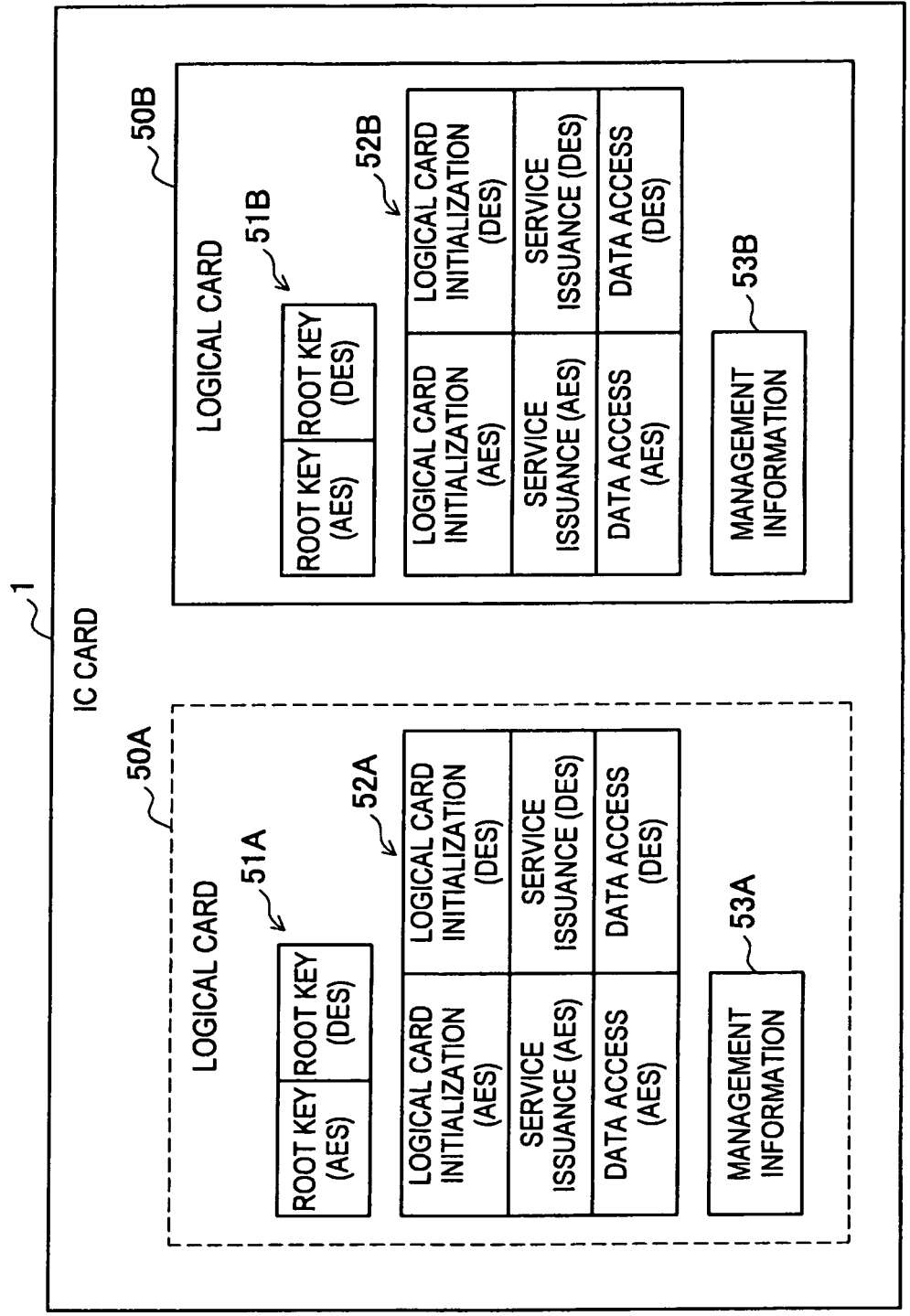
FIG. 6 is an illustrative diagram showing a configuration of a storage region of the IC card.
Figure 7:
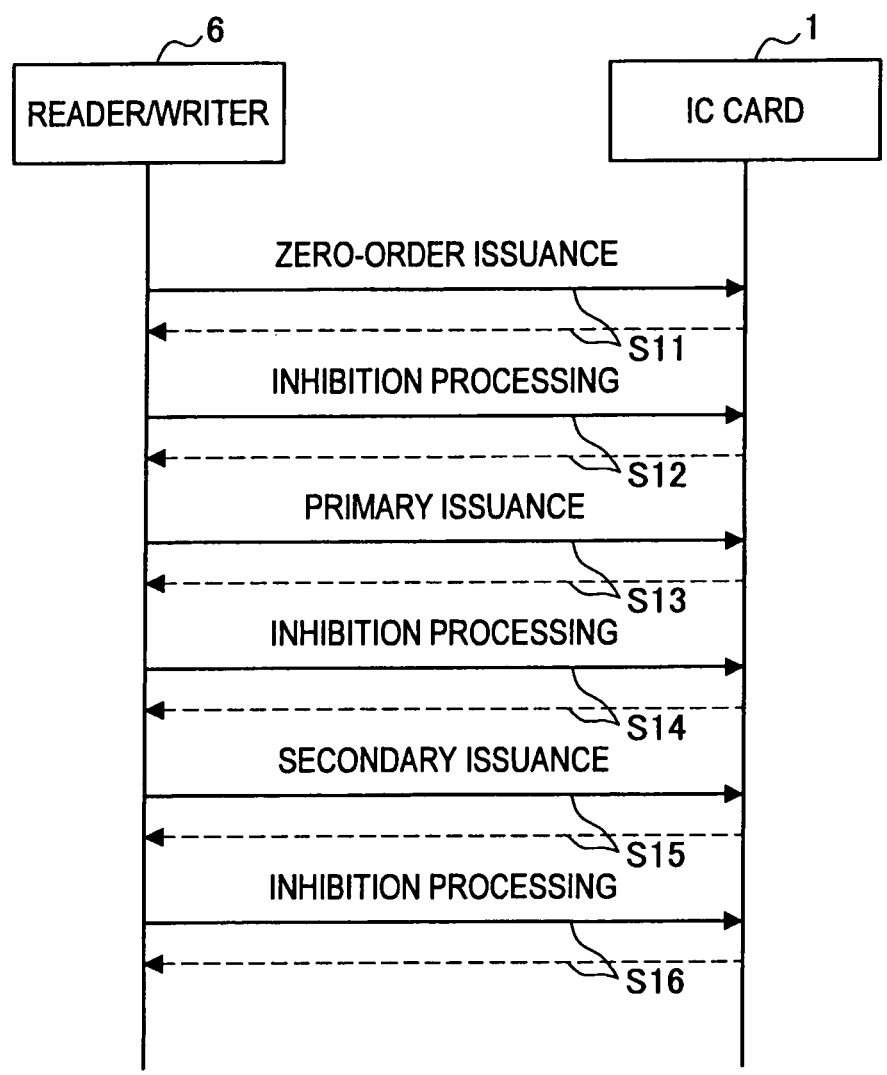
FIG. 7 is a sequence diagram showing a procedure of issuance of the IC card.

Next, the storage region of the IC card 1 and the issuance process of the IC card 1 will be described with reference to FIGS. 6 and 7. FIG. 6 shows a configuration of the storage region of the IC card 1, and FIG. 7 shows the issuance process of the IC card 1. Hereinafter, the IC card 1 will be described as an example of the information processing device. FIG. 6 shows only a configuration of part of the storage region related to the inhibition processing.

As shown in FIG. 6, one or more logical cards (for example, logical cards 50A and 50B) are formed in the IC card 1. In the data storage section 31, unique storage regions (storage regions 33A, 33B, and the like shown in FIG. 5) for storing root keys 51A, 51B, and the like, inhibition flags 52A, 52B, and the like, and management information 53A and 53B, and the like are allocated for the respective logical cards 50A, 50B, and the like.

The respective logical cards 50A, 50B, and the like correspond to a plurality of encryption schemes having different security strengths such as DES and AES. The root keys 51A, 51B, and the like are encryption keys (DES root keys, AES root keys, and the like) respectively corresponding to different encryption schemes. In each logical card 50A, 50B, or the like, mutual authentication, cryptographic communication, and data access are performed using a root key 51A, 51B, or the like of an encryption scheme designated by the reader/writer 4 or 6 of the external device 3 or 5.

The inhibition flag 52A, 52B, or the like is used to inhibit predetermined manipulation from being performed in the storage region. The management information 53A, 53B, or the like is used to manage user data to be used in a service using each logical card 50A, 50B, or the like.

In each logical card 50A, 50B, or the like, manipulations such as logical card initialization, service issuance, and data access are performed in a storage region to be used in a service. In each logical card, predetermined manipulation for a storage region such as logical card initialization or service issuance is inhibited using the inhibition flag 52A, 52B, or the like. In each logical card 50A, 50B, or the like, a state of the inhibition flag 52A, 52B, or the like is checked upon manipulation, and the execution of the manipulation is inhibited if the manipulation is inhibited.

In the logical card initialization manipulation, the format of a storage region unique to each logical card 50A, 50B, or the like is initialized. In the service issuance manipulation, service information for receiving a service using each logical card 50A, 50B, or the like is issued, and data regarding the service is added to a predetermined storage region. In the data access manipulation, data to be used in a service using the logical card 50A, 50B, or the like is read/written.

Each manipulation corresponds to each of different encryption schemes. If no manipulation is inhibited, each manipulation can be executed using any encryption scheme. That is, the format initialization manipulation, the service issuance manipulation, and the data access manipulation can be executed without depending upon the encryption scheme. On the other hand, if manipulation is inhibited, for example, the logical card initialization manipulation by an encryption scheme having low security strength (for example, DES) is inhibited and/or the service issuance manipulation by the same encryption scheme is inhibited.

After physical issuance by a card issuer, the IC card 1 is divided into the logical cards 50A, 50B, and the like to which unique storage regions are allocated. Here, the IC card 1 is configured to enable a service using each logical card 50A, 50B, or the like to be operable by an operator having a different service operation scheme. In the IC card 1, for example, a service using the logical card 50A is operated by the card issuer and a service using the logical card 50B is operated by the operator other than the card issuer.

As shown in FIG. 7, zero-order to secondary issuances (steps S11, S13, and S15) are performed between the reader/writer 4 or 6 of the external device 3 or 5 and the IC card 1 in the IC card system. The case where the zero-order to secondary issuances are performed by the issuing device 5 will be described below, but at least a partial process may be performed by the external device of the service providing device 3 or the like.

In the zero-order issuance (S11), manufacturing information/information including a shipment key of the IC card 1 is transmitted to the IC card 1 and is stored in a predetermined storage region. In the primary issuance (S13), information including formats of various types of services is transmitted to the IC card 1 and is stored in a predetermined storage region. In the secondary issuance (S15), information for writing user data and information for writing an initial value of data regarding a service are transmitted to the IC card 1 and are stored in a predetermined storage region.

Here, the zero-order issuance (S11) is performed in a unit of the IC card 1 and the primary and secondary issuances (S13 and S15) are performed in units of the logical cards 50A, 50B, and the like. Inhibition processing for inhibiting predetermined manipulation is performed at any of a zero-order issuance time, a primary issuance time, and a secondary issuance time in the units of the logical cards 50A, 50B, and the like (S12, S14, and S16).

[4. Manipulation Inhibition Processing]

Figure 8:
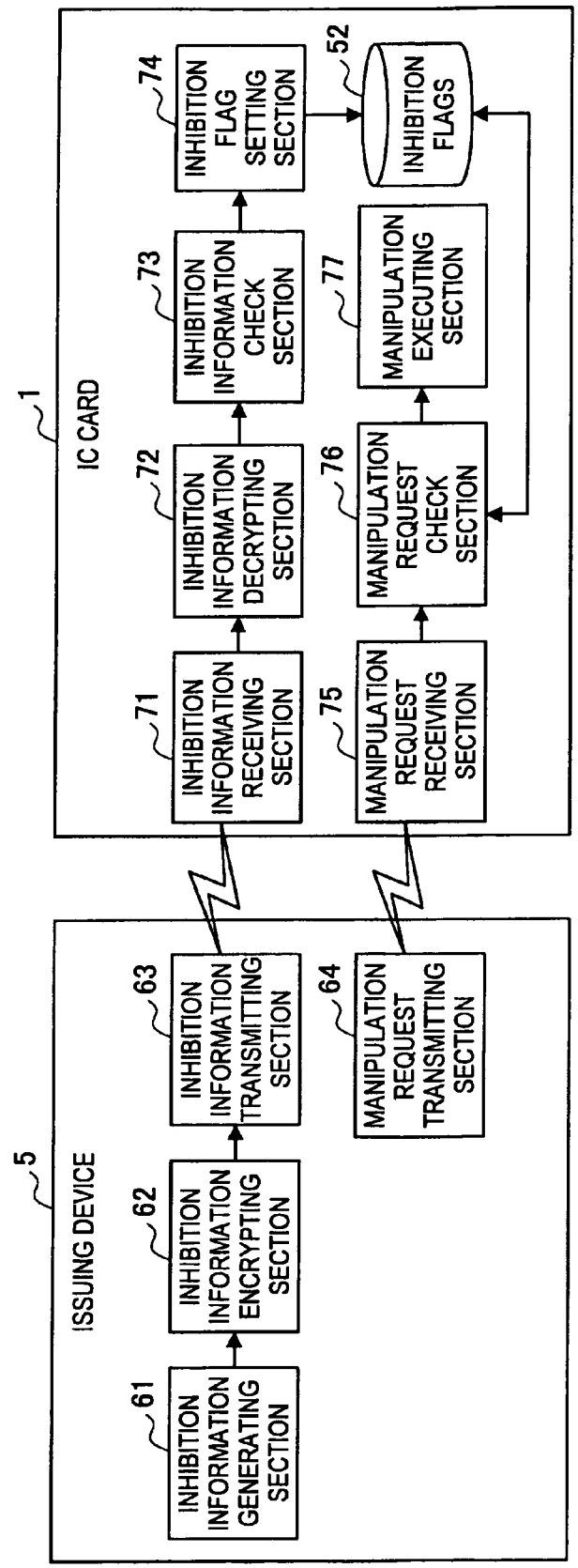
FIG. 8 is a block diagram showing a main configuration related to inhibition processing.
Figure 9:
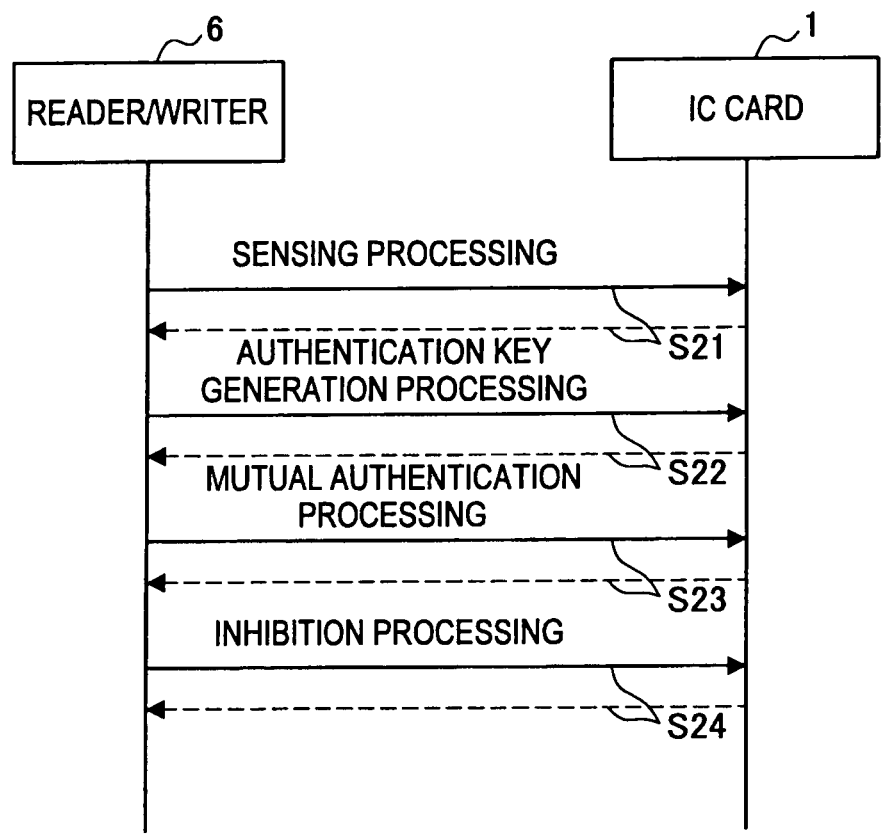
FIG. 9 is a sequence diagram showing an inhibition processing procedure.
Figure 10:
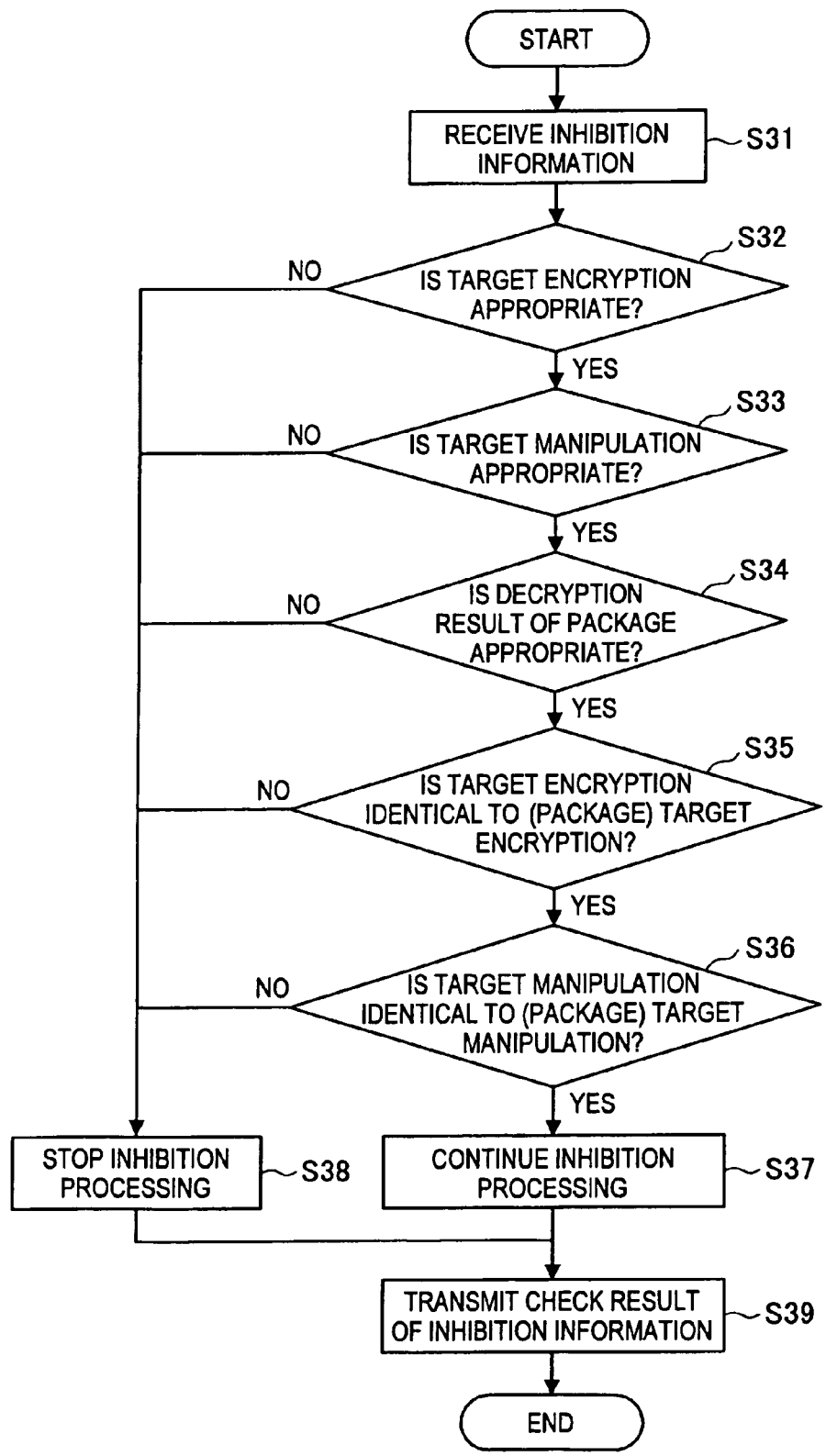
FIG. 10 is a flowchart showing an inhibition information check procedure.

Next, the manipulation inhibition processing to be performed between the IC card 1 and the external device 3 or 5 will be described with reference to FIGS. 8 to 10. FIG. 8 shows a main configuration related to the inhibition processing, FIG. 9 shows an inhibition processing procedure, and FIG. 10 shows an inhibition information check procedure.

As shown in FIG. 8, the external device 5 has an inhibition information generating section 61, an inhibition information encrypting section 62, an inhibition information transmitting section 63, and a manipulation request transmitting section 64. Here, the inhibition information generating section 61 is realized by the controller 9 shown in FIG. 3, and the inhibition information encrypting section 62, the inhibition information transmitting section 63, and the manipulation request transmitting section 64 are realized by the reader/writer 6 shown in FIG. 3.

On the other hand, the IC card 1 has an inhibition information receiving section 71, an inhibition information decrypting section 72, an inhibition information check section 73, an inhibition flag setting section 74, a manipulation request receiving section 75, a manipulation request check section 76, and a manipulation executing section 77. Here, the inhibition information receiving section 71 and the manipulation request receiving section 75 are realized by the receiving section 11 shown in FIG. 4, and the inhibition information decrypting section 72 is realized by the decrypting section 12. The inhibition information check section 73, the inhibition flag setting section 74, the manipulation request check section 76, and the manipulation executing section 77 are realized by the control section 20 shown in FIGS. 4 and 5. The external device 5 may be separately configured as a first device that processes inhibition information and a second device that processes a manipulation request.

In the external device 5, the inhibition information generating section 61 generates inhibition information for inhibiting predetermined manipulation to a storage region of the IC card 1. As will be described below in detail, manipulation to be inhibited is designated in the inhibition information. The manipulation to be inhibited is designated as predetermined manipulation to be performed by an encryption scheme having low security strength (DES or the like). The inhibition information encrypting section 62 encrypts (encryption information) at least part of the inhibition information by an encryption scheme having high security strength (AES or the like). The inhibition information transmitting section 63 transmits the inhibition information including encryption information to the IC card 1. If the user requests the external device 5 to perform manipulation, the inhibition information transmitting section 63 transmits a manipulation command corresponding to the requested manipulation to the IC card 1.

On the other hand, in the IC card 1, the inhibition information receiving section 71 receives the inhibition information including the encryption information from the external device 5. The inhibition information decrypting section 72 decrypts the encryption information by an encryption scheme having high security strength. The inhibition information check section 73 checks validity of the inhibition information including the decrypted encryption information. If the validity of the inhibition information is checked, the inhibition flag setting section 74 sets an inhibition flag 52 for inhibiting predetermined manipulation using the inhibition information. The inhibition flag setting section 74 functions as an inhibition processing section.

The manipulation request receiving section 75 receives the manipulation command corresponding to manipulation requested by the user from the external device 5. The manipulation request check section 76 checks whether the manipulation corresponding to the manipulation command corresponds to predetermined manipulation to be inhibited by referring to the inhibition flag 52. The manipulation executing section 77 executes the manipulation only if the manipulation corresponding to the manipulation command does not correspond to the predetermined manipulation to be inhibited.

Hereinafter, an example of an inhibition processing procedure will be described with reference to FIG. 9. The inhibition processing may be performed according to other procedures. In the inhibition processing, sensing processing (S21) is first performed as shown in FIG. 9. The reader/writer 6 transmits a polling command designating a specific logical card 50A, 50B, or the like. If the user holds the IC card 1 over the reader/writer 6, the reader/writer 6 transmits a response command designating a specific logical card 50A, 50B, or the like as a sensing response to the IC card 1.

If the sensing response is made, an authentication key necessary for mutual authentication is generated using an encryption scheme having high security strength (AES or the like) between the reader/writer 6 and the IC card 1 (S22), and the mutual authentication is performed using the authentication key (S23).

If the mutual authentication is performed, the reader/writer 6 performs inhibition processing by designating predetermined manipulation (S24). The inhibition information generating section 61 generates, for example, inhibition information as will be described below for use in the inhibition processing by an instruction of the operator of each logical card 50A, 50B, or the like (wherein a number within the brackets is an example of the number of bytes of each data). A configuration of the inhibition information is only exemplary, and other configurations may be applied.

Target Encryption (1)
Target Manipulation (1)
Package (32)
   Target Encryption (within Package) (1)
   Target Manipulation (within Package) (1)
   Padding (14)
   Package MAC (16)

"Target Encryption" indicates an encryption scheme serving as a target of inhibition processing. For example, if the target is a DES encryption scheme, "Target Encryption" is designated as "01h." "Target Manipulation" indicates manipulation serving as a target of inhibition processing among predetermined processing items for a storage region. For example, "Target Manipulation" is designated as "01h" if the logical card initialization manipulation is inhibited, and is designated as "02h" if the service issuance manipulation is inhibited.

"Package" includes "Target Encryption (within Package)," "Target Manipulation (within Package)," "Padding," and "Package MAC," and is encrypted by a specific AES encryption key. The inhibition information encrypting section encrypts "Package" by an AES encryption key. "Target Encryption (within Package)" and "Target Manipulation (within Package)" are respectively the same information as "Target Encryption" and "Target Manipulation." "Padding" is used upon encryption of "Package," and "Package MAC" is used upon authentication of "Package."

Here, the operator of each logical card 50A, 50B, or the like determines whether to perform inhibition processing for predetermined manipulation to the logical card 50A, 50B, or the like. On the other hand, in general, the inhibition processing is performed by a card maker in the zero-order to secondary issuance times. Thus, "Package" is encrypted by an AES encryption key that is not known by the practitioner so that the inhibition processing is appropriately performed by the authorization of the operator since the operator of the logical card 50A, 50B, or the like may be different from a practitioner of inhibition processing.

If inhibition information is generated, the inhibition information transmitting section 63 transmits the inhibition information to the IC card 1. The IC card 1 checks validity of the inhibition information by the procedure shown in FIG. 10.

In check processing of the inhibition information, first, the inhibition information receiving section 71 receives the inhibition information from the external device 5, and the inhibition information decrypting section 72 decrypts "Package" by the AES encryption key (S31). "Package" may be decrypted at any point in time before the start of processing of step S34 to be described later.

The inhibition information check section 73 checks whether a predetermined encryption scheme and predetermined manipulation are respectively designated as "Target Encryption" and "Target Manipulation" (S32 and S33). Specifically speaking, using the above-described data example, it is checked whether "01h" is designated as "Target Encryption" and whether "01h" or "02h" is designated as "Target Manipulation."

The inhibition information check section 73 checks whether decryption is appropriately performed (S34). A decryption result of "Package" is verified for data manipulation using "Package MAC." Furthermore, it is checked whether "Target Encryption (within Package)" and "Target Manipulation (within Package)" are respectively the same as "Target Encryption" and "Target Manipulation" (S35 and S36).

The inhibition flag setting section 74 continues inhibition processing if all items described above are checked (S37), and stops the inhibition processing if any item described above is not checked (S38). The IC card 1 transmits a response indicating that the validity of the inhibition information is checked or not checked to the reader/writer 6 (S39).

If the inhibition processing is continued, the inhibition flag setting section 74 sets the inhibition flag 52 by "Target Encryption" and "Target Manipulation" in the specific logical card 50A, 50B, or the like. For example, if logical card initialization manipulation by DES is inhibited in the logical card 50A, a state of the inhibition flag 52 is set to "Inhibition" in the manipulation.

[5. Use Cases of IC Card]

Figure 11:
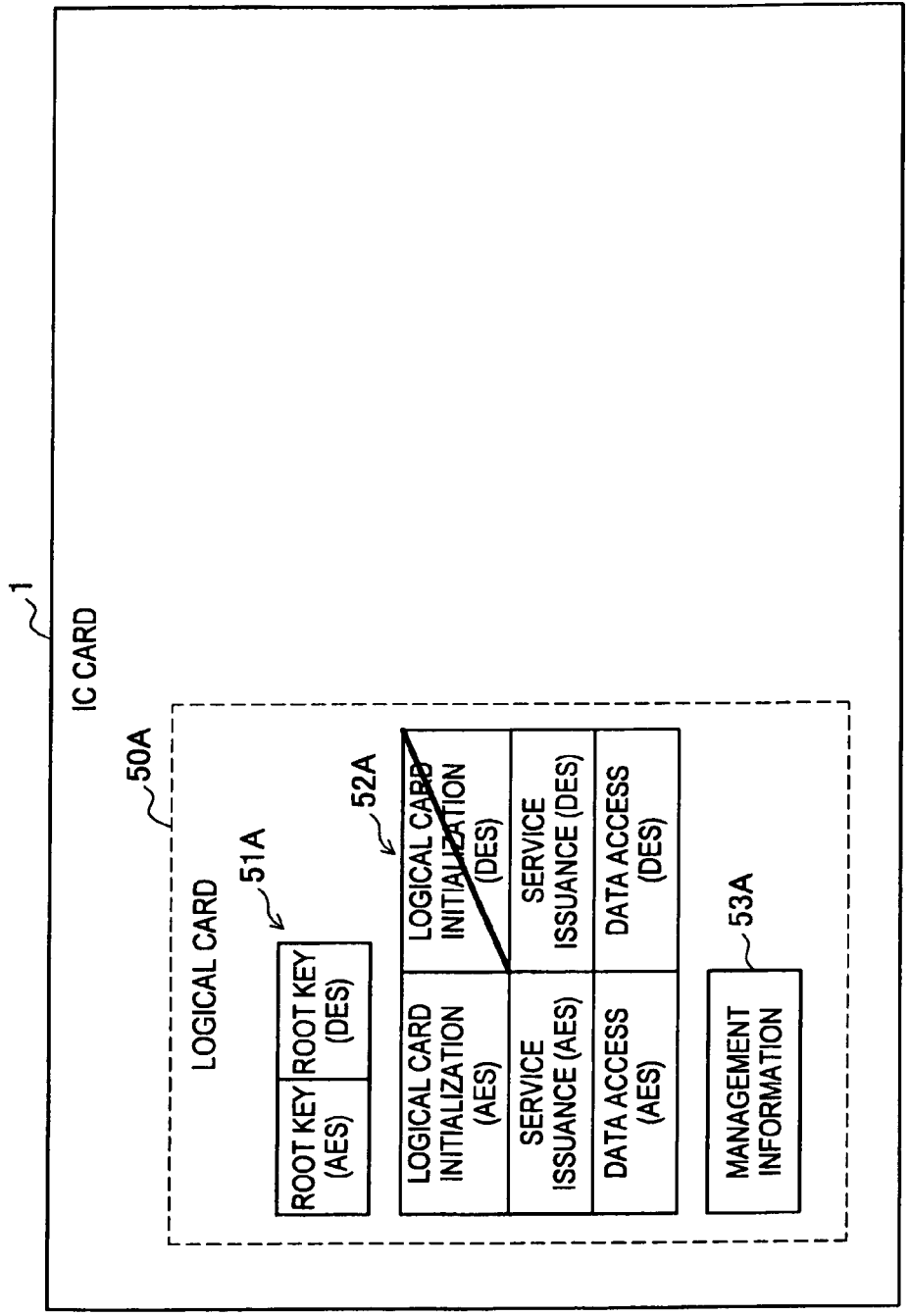
FIG. 11 is an illustrative diagram showing a configuration of a storage region corresponding to a first use case.
Figure 12:
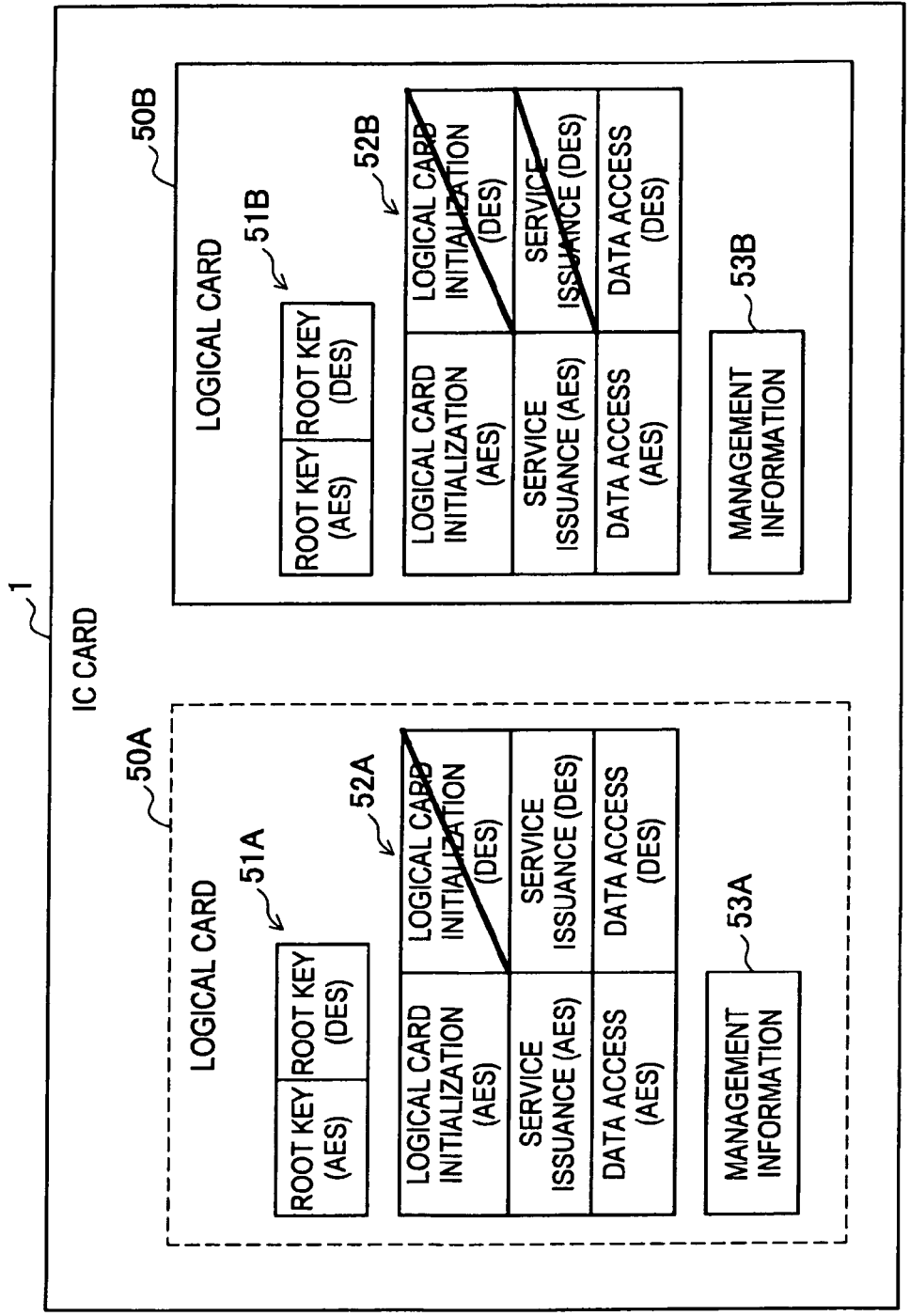
FIG. 12 is an illustrative diagram showing a configuration of a storage region corresponding to a second use case.
Figure 13:
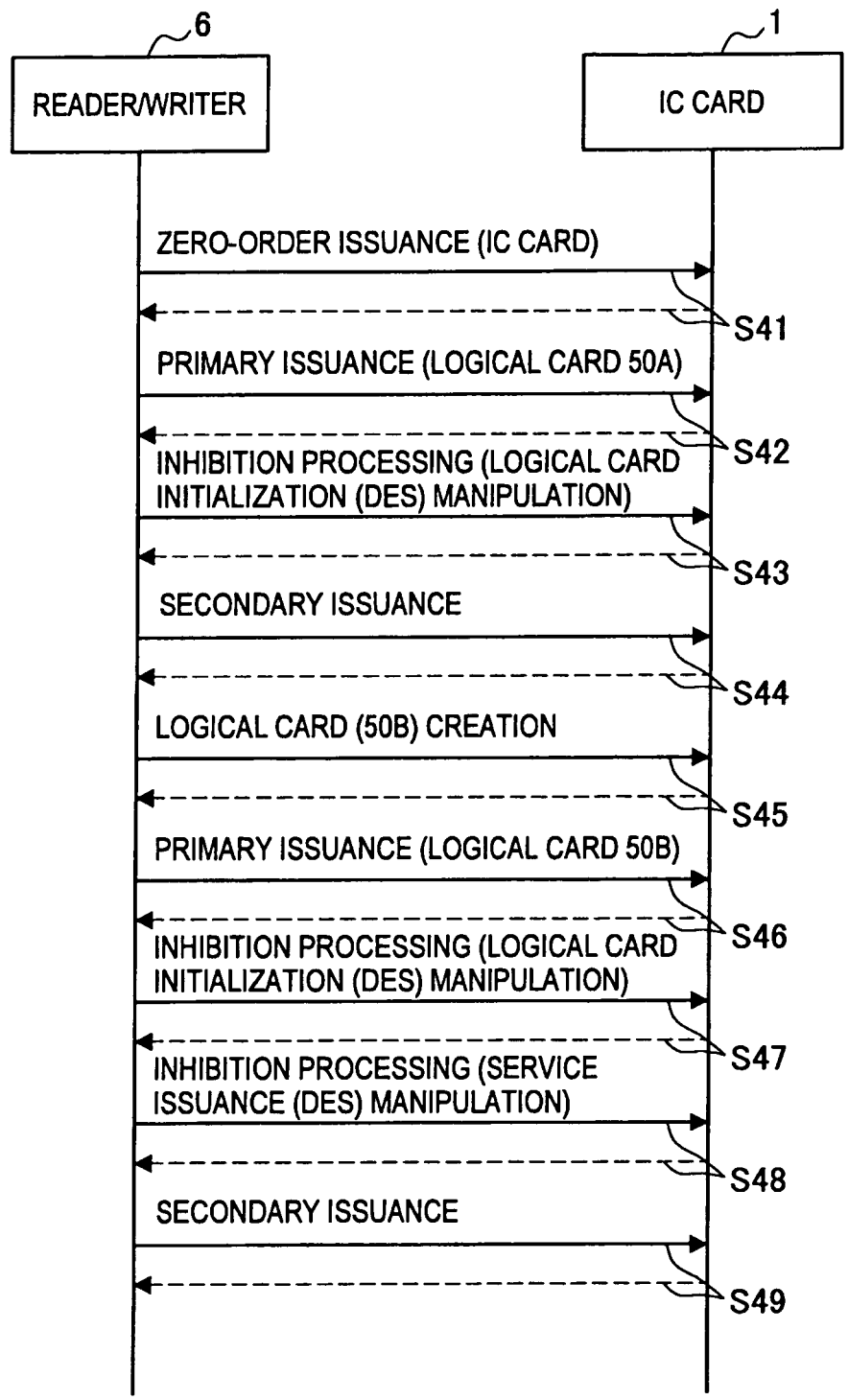
FIG. 13 is a sequence diagram showing a procedure of issuance of the IC card corresponding to the first use case and the second use case.

Next, the use cases of the IC card 1 will be described with reference to FIGS. 11 to 13. FIGS. 11 and 12 respectively show configurations of storage regions corresponding to first and second use cases. FIGS. 13 and 14 respectively show procedures of inhibiting unauthorized manipulations in the first and second use cases. In FIGS. 11 and 12, a mark "/" is added to the inhibition flag 52 of manipulation to be inhibited. FIG. 13 shows an issuance procedure of the IC card 1 corresponding to the first and second use cases. FIGS. 11 and 12 show only configuration of parts of the storage regions related to the inhibition processing.

In the first use case, it is assumed that the logical card 50A corresponds to a service using AES and DES and the user of the IC card 1 adds service information corresponding to only DES. In the second use case, it is assumed that the logical case 50B corresponds to only a service using AES. As an example of the use case, the logical card 50A, 50B, or the like may correspond to only a service using DES.

In the first use case, AES is used and also an available service is operated using the logical card 50A by an operating subject who performs service issuance by DES. That is, it is necessary for the logical card 50A to inhibit unauthorized execution of logical card initialization manipulation by DES while being compatible with service issuance manipulation by DES. Consequently, as shown in FIG. 11, in the logical card 50A, the service issuance manipulation by DES is not inhibited, and the logical card initialization manipulation by DES is inhibited. Thereby, an operating subject of the logical card 50A can inhibit unauthorized execution of the logical card initialization manipulation by DES while being compatible with the service issuance manipulation by DES.

In the second use case, an available service is operated using the logical card 50B by an operating subject using only AES. That is, since the logical card 50B is not compatible with the service issuance manipulation by DES, it is necessary to inhibit the unauthorized execution of the logical card initialization manipulation and the service issuance manipulation by DES. Consequently, as shown in FIG. 12, the logical card initialization manipulation and the service issuance manipulation by DES are inhibited. Thereby, the operating subject of the logical card 50B can inhibit the unauthorized execution of the logical card initialization manipulation and the service issuance manipulation by DES.

FIG. 13 shows an issuance procedure when the IC card 1 corresponding to the first and second use cases is issued. As shown in FIG. 13, first, the IC card 1 is issued in zero order (S41), that is, is physically issued. In a storage region of the IC card 1, information unique to the IC card 1 such as manufacturing information of the IC card 1 is stored. In the IC card 1, the logical card 50A is formed by the zero-order issuance and the storage region 33A unique to the logical card 50A is allocated.

Next, for correspondence to the first use case, the logical card 50A is primarily issued (S42), and information including the formats of various types of available services using the logical card 50A is stored in a predetermined storage region.

Next, inhibition processing for inhibiting the logical card initialization manipulation is performed (S43). In the logical card 50A, the logical card initialization manipulation by DES is inhibited. Next, the logical card 50A is secondarily issued (S44). Information for writing user data and an initial value of data regarding a service available using the logical card 50A is stored in a predetermined storage region. The inhibition processing (S43) of the logical card 50A may be performed in the zero-order issuance time or the secondary issuance time, instead of the primary issuance time.

Furthermore, for correspondence to the second use case, the logical card 50B is created at any point in time (S45). Next, the logical card 50B is primarily issued (S46). Next, the inhibition processing for inhibiting the logical card initialization manipulation by DES and the inhibition processing for inhibiting the service issuance manipulation by DES are performed (S47 and S48). The processing of steps S47 and S48 may be performed in reverse order. Thereby, in the logical card 50B, the logical card initialization manipulation and the service issuance manipulation by DES are inhibited. Next, the logical card 50B is secondarily issued (S49).

The inhibition processing (S47 and S48) of the logical card 50B may be performed in the secondary issuance time, instead of the primary issuance time. The inhibition processing may be divided and performed in the primary issuance time and the secondary issuance time. In this case, for example, the inhibition processing (S47) for inhibiting the logical card initialization manipulation may be performed in the primary issuance time, and the inhibition processing (S48) for inhibiting the service issuance manipulation may be performed in the secondary issuance time.

Hereinafter, a procedure of inhibiting the execution of unauthorized manipulation in the first and second use cases using the inhibition flags 52 will be described.

First, an example corresponding to the first use case will be described. As shown in FIG. 14, in the logical card 50A, the logical card initialization manipulation by DES is inhibited in advance by setting the inhibition flag 52 (S51 and S52). The reader/writer 4 of the external device such as the service providing device 3 transmits a polling command designating the logical card 50A. If an unauthorized user holds the IC card 1 over the reader/writer 4, the reader/writer 4 transmits a response command designating the logical card 50A as a sensing response to the IC card 1 (S53). If the sensing response is transmitted to the IC card 1, the reader/writer 4 performs authentication key generation processing and mutual authentication with the IC card 1 (S54 and S55).

Here, the case where only the DES encryption scheme may be available because the reader/writer 4 is not compatible with the AES encryption scheme or the AES encryption is invalidated is assumed. In this case, the DES encryption scheme is designated by the reader/writer 4, and the mutual authentication is performed using the DES encryption scheme between the reader/writer 4 and the IC card 1.

If the mutual authentication is performed, the unauthorized user instructs the external device 3 to execute the logical card initialization manipulation by DES through a predetermined manipulation input. The manipulation request transmitting section 64 transmits a manipulation command corresponding to the manipulation to the IC card 1 (S56). The manipulation request receiving section 75 receives the manipulation command. The manipulation request check section 76 refers to the inhibition flag 52 of the logical card 50A, and checks whether the execution of the manipulation is inhibited (S57).

In this case, the IC card 1 transmits a response command indicating that it is not possible to execute the manipulation to the reader/writer 4 since the execution of the manipulation is inhibited by the inhibition flag 52 (S58). If the response command is received, the external device 3 notifies the unauthorized user of the fact that the execution of the manipulation is inhibited. Thereby, it is possible to inhibit the unauthorized execution of the logical card initialization manipulation by DES. If the manipulation is not inhibited, the manipulation executing section 77 executes the manipulation.

Next, an example corresponding to the second use case will be described. As shown in FIG. 15, the logical card initialization manipulation and the service issuance manipulation are inhibited in advance by setting the inhibition flag 52 in the logical card 50B (S61 to S64). The reader/writer 4 transmits a polling command designating the logical card 50B. If the unauthorized user holds the IC card over the reader/writer 4, the reader/writer 4 transmits a response command designating the logical card 50B as a sensing response to the IC card 1 (S65). If the sensing response is made, authentication key generation processing and mutual authentication are performed using the DES encryption scheme between the reader/writer 4 and the IC card 1 as in the first use case (S66 and S67).

If the mutual authentication is performed, the unauthorized user instructs the external device 3 to execute the logical card initialization manipulation or the service issuance manipulation through a predetermined manipulation input. The manipulation request transmitting section 64 transmits a manipulation command corresponding to the manipulation to the IC card 1 (S68 and S71). The manipulation request receiving section 75 receives the manipulation command. The manipulation request check section 76 refers to the inhibition flag 52 of the logical card 50B, and checks whether the manipulation is inhibited (S69 and S72).

In this case, the IC card 1 transmits a response command indicating that it is not possible to execute the manipulation to the reader/writer 4 since the manipulation is inhibited by the inhibition flag 52 (S70 and S73). If the response command is received, the external device 3 notifies the unauthorized user of the fact that the execution of the manipulation is inhibited. Thereby, it is possible to inhibit the unauthorized execution of the logical card initialization manipulation or the service issuance manipulation by DES. If the manipulation is not inhibited, the manipulation executing section 77 executes the manipulation.

[6. Summary]

According to the information processing device related to the embodiment of the present disclosure as described above, inhibition information for inhibiting predetermined manipulation from being performed in a storage region of the information processing device using a first encryption scheme is received from an external device using a second encryption scheme, and inhibition processing for inhibiting the predetermined manipulation by the inhibition information is performed. If a manipulation request is received from the external device or another external device and a requested manipulation does not correspond to the predetermined manipulation inhibited by the inhibition information, the requested manipulation is executed. Thereby, it is possible to inhibit unauthorized manipulation from being performed in a storage region using an encryption scheme having low security strength.

The storage region is divided into a plurality of logical regions respectively available by different operating subjects, and the inhibition information is set by authorization of an operating subject capable of using each logical region so as to inhibit predetermined manipulation from being performed in each logical region using the first encryption scheme. Thereby, it is possible to secure a security property for data capable of being used by each operating subject between the plurality of logical regions.

Preferred embodiments of the present disclosure have been described above in detail with reference to the appended drawings, but the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the case where the information processing device 1 or 2 is compatible with two encryption schemes including DES and AES schemes has been described above, but the information processing device 1 or 2 may be compatible with three or more encryption schemes. The case where the information processing device 1 or 2 has two logical cards 50A and 50B has been described above, but the information processing device 1 or 2 may have three or more logical cards 50A, 50B, 50C, . . . .

The case where predetermined manipulation to a storage region is inhibited in a unit of the logical card 50A, 50B, or the like has been described above. However, the predetermined manipulation may be inhibited in a unit of an available service using the logical card 50A, 50B, or the like, instead of the unit of the logical card 50A, 50B, or the like. That is, the predetermined manipulation may be inhibited in a service A of available services A and B using the same logical card 50A, 50B, or the like, and the predetermined manipulation may be permitted in the service B.

What is claimed is:

1. An information processing device, comprising:
an inhibition information receiving section for receiving, from an external device, inhibition information generated by the external device for inhibiting a predetermined manipulation from being performed in a storage region of the information processing device using a first encryption scheme but not inhibiting the predetermined manipulation from being performed in the storage region of the information processing device using a second encryption scheme, the first encryption scheme having a security strength lower than that of the second encryption scheme, and the inhibition information being received from the external device according to the second encryption scheme;
an inhibition processing section for performing inhibition processing for inhibiting the predetermined manipulation from being performed using the first encryption scheme based on the inhibition information;
a manipulation request receiving section for receiving a manipulation request from the external device or from another external device; and
a manipulation executing section for executing the requested manipulation if the requested manipulation does not correspond to the predetermined manipulation inhibited from being performed using the first encryption scheme by the inhibition information.

2. The information processing device according to claim 1, wherein: the storage region is divided into a plurality of logical regions respectively available by different operating subjects, and the inhibition information is set by authorization of an operating subject capable of using each of the logical regions so as to inhibit predetermined manipulation from being performed in each of the logical regions using the first encryption scheme.

3. The information processing device according to claim 1, wherein the inhibition information includes information that designates inhibition of format initialization manipulation of the storage region as the predetermined manipulation.

4. The information processing device according to claim 1, wherein the inhibition information includes information that designates inhibition of addition of service information to the storage region as the predetermined manipulation.

5. An information processing method which is carried out using an information processing device, the method comprising:
receiving, from an external device, inhibition information generated by the external device for inhibiting a predetermined manipulation from being performed in a storage region of the information processing device using a first encryption scheme but not inhibiting the predetermined manipulation from being performed in the storage region of the information processing device using a second encryption scheme, the first encryption scheme having a security strength lower than that of the second encryption scheme, and the inhibition information being received from the external device according to the second encryption scheme;

performing inhibition processing for inhibiting the predetermined manipulation from being performed using the first encryption scheme based on the inhibition information;

receiving a manipulation request from the external device or from another external device; and executing the requested manipulation if the requested manipulation does not correspond to the predetermined manipulation inhibited from being performed using the first encryption scheme by the inhibition information.

6. A non-transitory computer-readable recording medium having recorded therein a computer program for causing a computer to execute the information processing method of claim 5.

* * * * *